United States Patent Office 3,634,367
Patented Jan. 11, 1972

3,634,367
THERMALLY STABILIZED ACRYLIC POLYMERS
Edgar Reed Lang, Glenside, and Robert Leslie Kelso, Yardley, Pa., assignors to Rohm and Haas Company, Philadelphia, Pa.
No Drawing. Continuation of application Ser. No. 729,416, May 15, 1968, which is a continuation-in-part of applications Ser. No. 589,500 and Ser. No. 589,514, both Oct. 26, 1966. This application July 30, 1970, Ser. No. 59,695
Int. Cl. C08f 15/18
U.S. Cl. 260—79.7                                                    11 Claims

ABSTRACT OF THE DISCLOSURE

Methyl methacrylate with or without other monomers, such as styrene, is copolymerized with about 0.1 to 5% of ethylthioethyl methacrylate to provide polymers having improved thermal stability.

This application is a continuation of our copending application Ser. No. 729,416 filed May 15, 1968, now abandoned which in turn is a continuation-in-part of each of applications Ser. Nos. 589,500 and 589,514, both filed on Oct. 26, 1966 both now abandoned.

This invention relates to the production of acrylic homopolymers, interpolymers, or copolymers, of improved thermal stability.

Acrylic polymers are widely marketed and used in industry today—typical are methyl methacrylate polymers and copolymers in the form of molding powder and cast sheet and end use products fabricated therefrom. These polymers possess an outstanding combination of useful properties, including, for example, ease of fabrication, exceptional clarity and lack of color, good outdoor weatherability, stability to light, and moderately high softening temperature, etc. At low or moderate temperatures, these polymers have reasonably good heat stability characteristics, but at higher temperatures they tend to degrade by oxidation and/or depolymerization. It is with this latter characteristic that the present invention is particularly concerned.

The prior art has suggested broadly the use of sulfur-containing compounds for thermal stabilization. However, their use has been limited because the procedures involving their incorporation were cumbersome or because they were ineffective. For example, Marks in U.S. Pat. 2,565,141 claims the use of dialkyl monosulfides for thermal stabilization of methyl methacrylate polymers but such use is apparently limited to granular polymers prepared in the presence of the dialkyl sulfide. Moreover, a post-polymerization heat treatment at 125° C. to 150° C. for a period of at least two hours is required for activation of the sulfide. The use of ethylsulfinylethyl methacrylate as thermal stabilizer has also been suggested but has proved to be ineffective. For example, an anionically initiated polymer of methyl methacrylate containing 1% by weight of ethylsulfinylethyl methacrylate showed a weight loss of 21% after 8 hours, a weight loss of 66% after 16 hours and a weight loss of 67% after 24 hours, all at 220° C. in air.

An object of the present invention is to improve the thermal stability of acrylic polymers, and especially methyl methacrylate polymers and copolymers, particularly at high temperatures. Another object is to improve the thermal stability of such polymers without affecting the clarity, optical properties and lack of color thereof.

It has been discovered that copolymerization of (a) ethylthioethyl methacrylate with (b) a monomeric material consisting essentially of methyl methacrylate or of a mixture of methyl methacrylate and at least one other monomer selected from the group consisting of a ($C_1$–$C_4$) alkyl acrylate, styrene, $\alpha$-methylstyrene, and a ($C_2$–$C_4$) alkyl methacrylate produces copolymers with improved thermal stability as compared to polymers obtained which do not contain the ethylthioethyl methacrylate. The ethylthioethyl methacrylate should comprise about 0.1% to about 5% by weight of the total or combined weights of (a) and (b), with the monomeric material (b) comprising the balance. Thermal stability, as used herein, is used in a broad sense and includes substantially all thermally activated degradation such as oxidation and depolymerization or pyrolysis.

All parts and percentages given throughout the specification are on a weight basis unless otherwise indicated.

The use of ethylthioethyl methacrylate in accordance with the teachings of the present invention avoids the limitations of the prior art not only in terms of superior thermal stabilization performance, but also because it is incorporated into the methyl methacrylate polymer chain, thereby precluding its vaporization or easy removal during subsequent processing. The clarity and lack of color characteristics of the resulting stabilized polymers is also outstanding.

The monomeric material (b) and ethylthioethyl methacrylate (a) may be copolymerized in bulk, in solution, or in either an emulsion or suspension technique to produce various types of addition polymers including a granular type. Solution polymerization may be effected in any suitable solvent for the product obtained. The copolymers or interpolymers may be formed by a free-radical system or by an anionic polymerization system.

For example, the polymerization may be effected with the aid of a free-radical initiator or catalyst, such as an organic or inorganic peroxide catalyst, peroxy catalysts, such as persulfates, and the azo catalysts. From about 0.05% to about 3% or more of the initiator or catalyst may be used, based on the total weight of the components (a) and (b). To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\beta$-dimethylvaleronitrile), azobis($\alpha,\beta$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or methabisulfite, or hydrosulfite, or hydrazine. The action of the redox system may be controlled through use of a chain-transfer agent or regulator, such as lauryl mercaptan, other mercaptans, or bromotrichloromethane. Such regulator also finds use outside of redox systems with organic or inorganic peroxide and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it.

When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer. Polymerization may also be effected in a solvent for the monomers in which the polymer obtained is insoluble.

In the case of emulsion polymerization, examples of suitable non-ionic emulsifiers include the higher alkyl phenoxypolyethoxyethanols in which the alkyl group has from 6 to 18 carbon atoms, such as octyl, dedecyl, or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

When a copolymer is obtained by the sequestial polymerization of methyl methacrylate and one or more other comonomers using in two or more successive stages monomeric material of different composition so as to produce a heterogeneous copolymer, such as one in which one or more monomers are (a) grafted onto part of the polymer obtained from one or more of the monmers or (b) formed into a layer about a core of such polymer, the ethylthioethyl methacrylate may be part of the first polymer or copolymer formed or it may be grafted onto, or formed into a copolymer layer about, a polymer which may or may not comprise some ethylthioethyl methacrylate copolymerized therein. In other words, the ethylthioethyl methacrylate may be in any polymeric component of a heterogeneous polymer system to provide thermal stabilization. This monomer may be in all differing polymeric components of such a polymer but need not be in all to provide thermal stabilization in the heterogeneous polymer. It is only necessary that the ethylthioethyl methacrylate be present in the proportion herein specified to assure effective stabilization.

In the case of the manufacture of the acrylic polymers in sheet form by casting and polymerization in bulk it is preferred to use a catalyzed monomer or monomer-polymer syrup. The ethylthioethyl methacrylate may be present in the monomer phase or as a part of the polymer or in both the polymer (as a polymerized component thereof) and the monomer phase. In an example, a syrupy mixture of 95 to 99.9 parts by weight of methyl methacrylate and 0.1 to 5 parts by weight of ethylthioethyl methacrylate containing about 0.05 to about 0.2% by weight of benzoyl peroxide as catalyst or initiator, may be poured into a mold comprised of glass plates and a flexible gasket, and cured into sheet form by heating at temperatures ranging from about 50° C. to 135° C. at atmospheric pressure or under sufficient pressure to prevent vaporization of the monomers for a period of about 12 to 16 hours for sheets below 0.125 inch in thickness, and for progressively larger periods of time in the case of thicker sheets. If desired, a minor amount of a chain transfer agent such as lauryl mercaptan, t-butyl mercaptan, t-amyl mercaptan, etc., and/or suitable colorants, pigments, ultraviolet stabilizers, etc. may also be included in the polymerization mixture.

The copolymerization of the ethylthioethyl methacrylate and methyl methacrylate or monomeric mixture comprising methyl methacrylate may also be carried out in an anionic polymerization process. Such process typically utilizes a polar, highly solvating medium at low temperatures, with a catalyst or initiator based on an alkali metal, alkaline earth metal, or quaternary ammonium salt. For example, the anionic copolymerization of methyl methacrylate may be conducted in a solution of sodium in liquid ammonia at −70° to −80° C. Additional information and techniques concerning the anionic polymerization of methyl methacrylate may be found in Fox et al., U.S. Pat. No. 3,103,503, issued Sept. 10, 1963.

Ethylthioethyl methacrylate is a liquid monomer of the following structure:

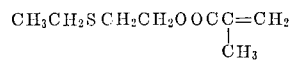

This monomer has a molecular weight of 174 and boils at 102° C. at 15 mm. Hg. Ethylthioethyl methacrylate may be formed by direct reaction of ethylthioethanol (ethyl mercaptoethanol) with the unsaturated acid, methacrylic acid, or by a transesterification reaction with an ester of the acid, such as the methyl or ethyl ester with ethylthioethanol.

In the following examples and tables, all parts and percentages are by weight unless otherwise mentioned or indicated.

EXAMPLE A

Preparation of ethylthioethyl methacrylate

A glass reaction vessel equipped with a stirrer, thermometer, and a packed reflux column having an arrangement for permitting removal of the distillate when desired, is charged with 424 grams (4 moles) of ethylmercaptoethanol, 870 grams (8.7 moles) of methyl methacrylate and 17 grams of diphenylphenylenediamine inhibitor.

The mixture is heated with stirring and refluxed for 15 minutes while 90 grams of distillate is removed at an overhead temperature range of 92 to 100° C. The mixture is allowed to cool to 80° C. and 6.64 grams of tetraisopropyl titanate is added. The mixture is heated with stirring and the methanol-methyl methacrylate azeotrope is distilled off up to 70° C. The pot temperature is increased from 105° to 125° C. After five hours virtually no more distillate comes over. A total of 164.7 grams of distillate is obtained, $n_D^{25}$ 1.3523. This contained 72.3% methanol or 119.3 grams which is 94% of the theoretical amount.

The reaction mixture (1053.6 grams) is cooled immediately in ice and stored overnight in the refrigerator. After addition of 10 grams of diphenylphenylene diamine, excess methyl methacrylate is distilled off at 25 mm. Hg. A total of 324 grams is recovered. The remaining 733 grams, after addition of 5 grams of the same inihibitor, is distilled through a packed column.

The following fractions were collected:

| Fraction | Boiling range (° C.) | Wt. (g.) | Percent yield | Percent S | Sap. No. | OH No. |
|---|---|---|---|---|---|---|
| A | Up to 55°/0.5 mm. Hg | 20.7 | | 19.8 | 283 | 67 |
| B | 55°/0.5 mm. to 55°/0.2 mm. Hg | 36.5 | | 18.7 | 316 | 20 |
| II | 51°/0.3 mm. to 51.5°/0.25 mm. Hg | 533.5 | 76.7 | 18.2 | 322 | 0 |
| Residue | | 93.7 | | | | |
| Calcd. for $C_8H_{14}O_2S$ | | | | 18.4 | 321.9 | 0 |

Yields in several runs varied from 67 to 85%. In one run elementary analyses were made with the following results:

*Analysis.*—Calcd. for $C_8H_{14}O_2S$ (percent): C, 55.14; H, 8.10; S, 18.40. Found (percent): C, 55.20; H, 8.11; S, 18.50.

EXAMPLE 1

Ethylthioethyl methacrylate is compolymerized with methyl methacrylate in both free radically initiated (cast sheet) and anionically initiated polymerizations. The products are tested for their resistance to thermal degradation as measured by weight loss for various times at elevated temperatures. The results are reported in Tables I and II below: (In the tables, ethylthioethyl methacrylate is abbreviated as ETEMA, and methyl methacrylate as MMA).

TABLE I

[Free radically initiated polymethyl methacrylate and copolymer thereof with ethylthioethyl methacrylate [1]]

| Composition | | Percent weight loss at 200° C. in air | | | | |
|---|---|---|---|---|---|---|
| Percent ETEMA by wt. of total of ETEMA plus MMA | Percent MMA by wt. of total of ETEMA plus MMA | 1 hr. | 2 hrs. | 4 hrs. | 6 hrs. | 24 hrs. |
| 0 | 100 | 2.3 | 4.8 | 9.1 | 14.6 | 50.6 |
| 1 | 99 | 0.4 | 0.5 | 0.6 | 0.7 | 1.0 |

[1] Initiated with 0.015% acetyl peroxide at 60° C. and polymerized for about 30 hours.

TABLE II

[Anionically initiated polymethyl methacrylate and copolymer thereof with ethylthioethyl methacrylate [1]]

| Composition | | Percent weight loss at 220° C. in air | | | | |
|---|---|---|---|---|---|---|
| Percent ETEMA by wt. of total of ETEMA plus MMA | Percent MMA by wt. of total of ETEMA plus MMA | 2 hrs. | 4 hrs. | 8 hrs. | 16 hrs. | 24 hrs. |
| 0 | 100 | 3.5 | 12.5 | 25.5 | 64.0 | 65.0 |
| 0.5 | 99.5 | 0.5 | 0.5 | | 1.5 | 1.0 |
| 1.0 | 99.0 | 1.0 | 1.5 | 1.0 | 2.5 | 2.0 |

[1] Initiated with sodium-lithium oxidation products; polymerized in liquid ammonia at −70° C. in glass.

The dramatic improvement in thermal stability is self-evident from Tables I and II above. More than 50-fold improvement is shown in the case of both the free-radically initated and anionically initiated polymers at exposure times of 24 hours at 200° C. and at 220° C. in air. At lesser exposure times the improvement is also pronounced. The ethylthioethyl methacrylate should be used in the range of from about 0.1% by weight to about 5% by weight, since with amounts less than about 0.1% there is no decided improvements and with amounts greater than about 5% by weight there is no significant additional improvement. Preferably, the amount of the ethylthioethyl methacrylate will vary between 0.5% by weight and 3% by weight.

EXAMPLE 2

(a) A monomeric mixture of the following monomers is prepared:

| | Parts by weight |
|---|---|
| Methyl methacrylate | 75 |
| α-Methyl styrene | 25 |
| Ethyl acrylate | 2 |
| | 102 |

Polymerization is initiated with t-butyl peracetate as initiator and carried out at an average temperature of about 85° C. The polymerization product shows a weight loss of about 8% (based on original weight) after heating in air for four hours at 230° C. Weight loss of the polymerization product is greater than 60% after heating in air for one hour at 260° C.

(b) Example 2(a), above, is repeated except that there is added one part by weight of ethylthioethyl methacrylate to the monomeric mixture. This polymerization product shows a weight loss of only about 1.2% after heating in air for four hours at 230° C. Weight loss of the interpolymer is less than 10% after heating in air for one hour at 260° C.

(c) Comparable improvements in thermal stability are obtained by varying the ethylthioethyl methacrylate content from 0.1 part to 5 parts by weight in combination with the formulation of (a) above.

EXAMPLE 3

A series of interpolymers is prepared by polymerizing in the presence of a free radical initiator (1) a monomeric mixture of 99 parts of methyl methacrylate with 1 part of ethyl acrylate; and, (2) a monomeric mixture of 99 parts of methyl methacrylate and 1 part of ethyl acrylate in combination with 1 part of ethylthioethyl methacrylate. Product (1), containing no ethylthioethyl methacrylate, shows the following weight losses after heating in air at 260° C.: 5% after 1 hour; 13 to 14% after 2 hours; 45% after 3 hours; greater than 60% after 4 hours. Product (2), i.e., the interpolymer of methyl methacrylate, ethyl acrylate and ethylthioethyl methacrylate, shows the following weight losses after heating in air at 260° C.: 4 to 5% after 1 hour; 7% after 2 hours; 10% after 3 hours; 13 to 14% after 4 hours.

Preferably, the monomeric mixture, which is to be copolymerized with the ethylthioethyl methacrylate, contains at least 60% by weight of methyl methacrylate with the balance of said mixture being made up of 1 to 40% by weight of one or more of the monomers consisting of a $(C_1-C_4)$ alkyl acrylate, such as methyl acrylate, ethyl acrylate, propyl acrylate, n-butyl acrylate, isobutyl acrylate, etc., styrene, α-methyl styrene or a $(C_2-C_4)$ alkyl methacrylate such as ethyl methacrylate, propyl methacrylate, n-butyl methacrylate, isobutyl methacrylate, etc. In the case of interpolymers or copolymers based on methyl methacrylate and styrene or α-methyl styrene it is preferred that the ratio of methyl methacrylate to the styrene or α-methyl styrene be in the range of about 1.5 to 1 to about 4 to 1. Particularly effective stabilized interpolymers are those prepared from 65 to 85 parts of methyl methacrylate, 35 to 15 parts of styrene or α-methyl styrene, 0 to 5 parts of ethyl acrylate, and 0.1 to 5 parts, more preferably 1 to 3 parts, of ethylthioethyl methacrylate. Other effective stabilized interpolymers are those prepared from 95 to 99 parts of methyl methacrylate, 1 to 5 parts of ethyl acrylate, more preferably 1 or 2 parts of ethyl acrylate, and 0.1 to 5 parts, more preferably 1 to 3 parts, of ethylthioethyl methacrylate.

The particular form in which the stabilized polymers of the present invention are used is not a limitation thereon; thus, they may be used in the form of molding powders, cast sheet, coatings, etc. The improved thermal stability of the molding powders adapts them to be used in injection molding or extrusion machines wherein such high temperatures may be encountered that the unmodified methyl methacrylate polymer would be noticeably degraded.

We claim:

1. A moldable composition used for forming articles of manufacture comprising a copolymer characterized by improved thermal stability, the units of which consist essentially of:
    (a) ethylthioethyl methacrylate and
    (b) a mixture of at least 60% methyl methacrylate and at least one monomer selected from the group consisting of $(C_1-C_4)$ alkyl acrylates, styrene, α-methylstyrene, and $(C_2-C_4)$ alkyl methacrylate, the proportion of component (a) being 0.1% to 5% by weight, based on the total weight of (a) and (b).

2. A moldable composition according to claim 1 wherein component (b) comprises 65 to 85 parts by weight of methyl methacrylate, 35 to 15 parts by weight of styrene or α-methylstyrene, and 0 to 5 parts by weight of ethyl acrylate.

3. A moldable composition according to claim 1 wherein component (b) comprises 95 to 99 parts by weight of methyl methacrylate and 1 to 5 parts by weight of ethyl acrylate.

4. A curable casting syrup containing the copolymer of claim 1.

5. A curable casting syrup containing the copolymer of claim 2.

6. A curable casting syrup containing the copolymer of claim 3.

7. A molding powder consisting of the composition of claim 1.

8. A cast acrylic sheet of improved thermal stability comprising the copolymer of claim 1.

9. A cast acrylic sheet of improved thermal stability comprising the copolymer of claim 2.

10. A cast acrylic sheet of improved thermal stability comprising the copolymer of claim 3.

11. An article of manufacture molded from the composition of claim 1.

References Cited

UNITED STATES PATENTS

| | | | |
|---|---|---|---|
| 2,925,406 | 2/1960 | McCurdy | 260—79.5 |
| 3,238,276 | 2/1966 | La Combe | 260—898 |
| 3,268,494 | 8/1966 | Herbert, Jr. | 260—79.7 |
| 3,269,991 | 8/1966 | La Combe | 260—79.7 |
| 3,278,500 | 10/1966 | Bailey, Jr. | 260—79.7 |
| 3,084,068 | 4/1963 | Munn | 117—76 |

JOSEPH L. SCHOFER, Primary Examiner

C. A. HENDERSON, Jr., Assistant Examiner

U.S. Cl. X.R.

260—481 R; 264—236